March 26, 1968  R. F. JULIUS  3,375,141
SOLAR CELL ARRAY

Filed July 22, 1963  3 Sheets-Sheet 1

INVENTOR
Richard F. Julius

BY Glenn S. Ovrevik
Agent

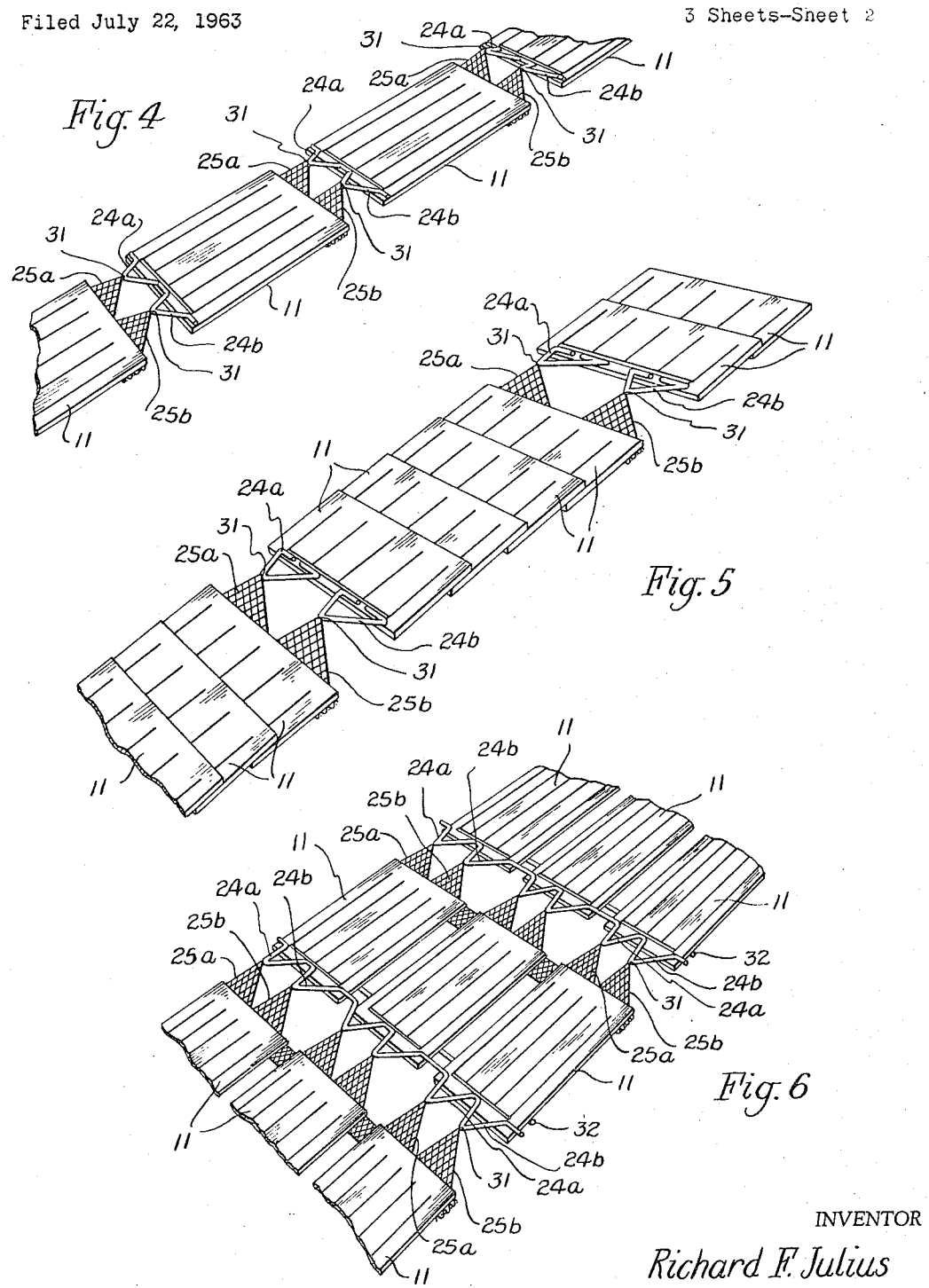

March 26, 1968   R. F. JULIUS   3,375,141
SOLAR CELL ARRAY
Filed July 22, 1963   3 Sheets-Sheet 3

INVENTOR
Richard F. Julius
BY

United States Patent Office 3,375,141
Patented Mar. 26, 1968

3,375,141
SOLAR CELL ARRAY
Richard F. Julius, Silver Spring, Md., assignor to Aiken Industries, Inc., a corporation of Delaware
Filed July 22, 1963, Ser. No. 296,626
3 Claims. (Cl. 136—89)

This invention relates in general to energy conversion devices of the solar cell variety and in particular to individual devices adapted for novel assembly and to the assembly of a plurality of such individual devices.

A wide variety of photo voltaic semiconductor devices, commonly known as solar cells, have been successfully employed to convert incident radiation energy into electrical energy. Such devices have considerable utility in remote, unattended ground applications despite the fact that the various dust layers, water vapor layers, etc., in the atmosphere encompassing the earth have a serious adverse effect on the efficiency of operation of most of these devices in many installations.

With the advent of outer space investigation, solar cell energy systems have taken on a greater prominence and have been utilized extensively in satellite applications. Solar cells have been utilized, for example, to maintain a charge on batteries during periods of exposure to radiation from the sun and on occasion to provide direct energization of selected electrical devices.

Solar cells are conventionally obtained as slices cut from specially prepared single crystal semiconductor ingots. The greater the area of the solar cell slice the greater the amount of incident radiation permissible per cell but, ironically, efficiency of the solar cell has been found to decrease with increased area. Thus the practical power output of a single cell is limited and the logical solution to this problem has been the grouping of single cells as an array to provide a power summation appropriate to the needs.

The use of solar cells in outer space is devoid, of course, of the adverse filtration effects common to most ground station applications and consequently relatively high operating efficiencies are possible in such uses. In general, however, these high operating efficiencies have not been attained with any degree of predictability heretofore due to a multitude of space vehicle and environmental complexities.

In particular, difficulties have been experienced in the use of materials which deteriorate when subject to radiation of the type and/or magnitude found in outer space. Heat dissipation problems have further complicated the picture in that operating efficiency is an inverse function of solar cell surface temperature and only a negligible amount of matter surrounds the satellite during flight to conduct heat away from the structure. One of the greatest problems, however, has involved the mechanical and electrical connection of individual solar cells and the tremendous physical stress and strain to which solar cell arrays are subjected during the vehicle launch operation. Frequently, vibrations develop to such a magnitude that standing waves in the solar cell array are clearly visible to the observer. Such intense vibration often disrupts electrical/mechanical connections with consequent partial or total disablement of the array. Manufacturers of solar cell arrays have endeavored to produce a structure which will withstand such abuse during launch by a more positive electrical connection and a greater strength mechanical assembly of cells and mounting surface, and various mounting surface modifications designed to provide a greater rigidity.

Although some success has been achieved, it has, in general, been accompanied by complex and indeterminate manufacturing techniques, greater production costs, increased weight, cell deterioration during the manufacturing process due to subjection of the cell to high temperatures for relatively long periods, etc. Consequently, an efficient lightweight solar cell array able to withstand the rigors of vehicle launch as well as long-term radiation bombardment, and highly reliable in unattended operation is needed and would be welcomed as a substantial advancement of the art. Accordingly:

It is a object of this invention to provide a relatively lightweight solar cell array which will withstand extensive vibration for continued periods.

It is another object of this invention to provide a solar cell array in which individual cells are flexibly mounted such that the array will withstand extreme vibrational modes.

It is still another object of this invention to provide a solar cell array in which individual cells are flexibly mounted such that the array will withstand transverse vibrational modes of relatively high magnitude.

It is another object of this invention to provide a solar cell array which is readily adaptable to surfaces having considerable curvature.

It is also an object of this invention to provide a solar cell array which utilizes nonorganic materials, exclusively.

It is a further object of this invention to provide a solar cell which may be electrically and mechanically interconnected with associated components with minimum disturbance of the photo voltaic characteristic of the solar cell during the interconnection thereof.

It is an additional object of this invention to provide a solar cell array in which substantially the entire surface area of each cell may be subject to incident radiation.

It is one more object of this invention to provide a solar cell array in which cells having selected characteristics may be grouped in a predetermined manner.

It is a further object of this invention to provide a solar cell array in which individual cells may be interconnected by welding.

Other objects of this invention will become apparent upon a more comprehensive understanding of the invention for which reference is had to the following specification and drawings wherein:

FIGURE 4 is a showing in perspective of several solar cell modules connected in series in accordance with one embodiment of this invention.

FIGURE 5 is a showing in perspective of several solar cell modules connected in series in accordance with a second embodiment of this invention.

FIGURE 6 is a showing in perspective of several solar cell modules connected in parallel in accordance with a third embodiment of this invention.

Figure 8A:
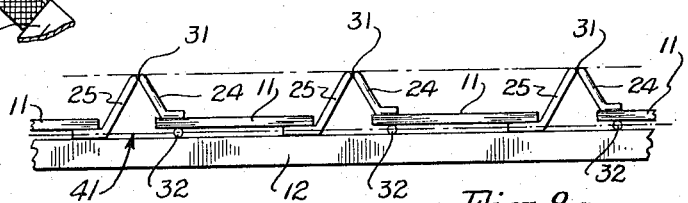

FIGURES 8a, b and c are diagrammatic cross-sectional showings of a flexible feature of the device of this invention.

Briefly, the solar cell array of this invention incorporates a new and novel module interconnection whereby vibration damage to the electrical and mechanical assembly is minimized. The unique interconnection of modules will withstand extreme flexing conditions of the type commonly experienced upon rocket launch of space vehicles. The array assembly also permits judicious selection and arrangement of modules having significant photo voltaic similarities or differences such that the over-all effect of the array can be determined prior to assembly with reasonable assurance of performance.

Figure 1:
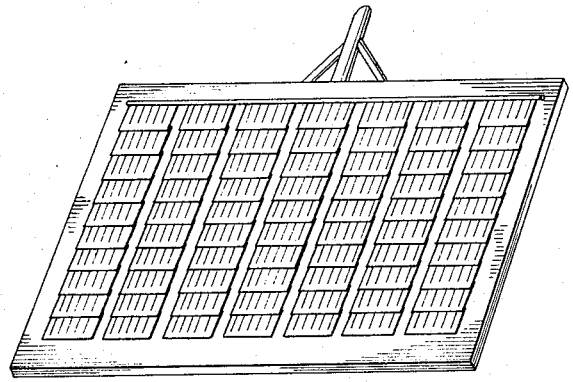
FIGURE 1 depicts a solar cell array typical of the prior art.

Referring now to the drawings:

FIGURE 1 depicts a solar cell array which has been used extensively in space vehicles with some degree of success. This type of array, commonly referred to as a shingle assembly of modules, is relatively compact and efficient and greatly reduces the number of wire interconnections heretofore required. It is generally recognized, however, that the shingle assembly is subject to damage under vibration conditions due in part to its reliance on rigid interconnections whereby the bond between modules and the modules themselves are subjected to considerable stress and strain during vibration. Likewise, it is recognized that the series interconnection in shingle fashion does not afford any redundancy advantage and that a break at any point will render a group of modules inoperative. In addition, the shingle assembly manufacturing technique involves considerable heating for a significant period of time with a resultant photo voltaic effect deterioration. This deterioration not only reduces efficiency but also introduces an element of uncertainty which prohibits determination of the over-all operating characteristic of the array prior to assembly.

Figure 2:
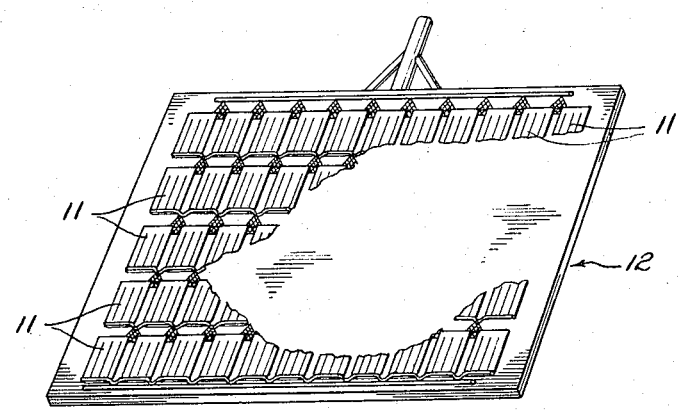
FIGURE 2 is a pictorial showing of a solar cell array in accordance with one embodiment of this invention.

FIGURE 2 is a pictorial showing of a solar cell array in accordance with the present invention wherein lay down modules are employed. That is, the modules 11 are not lapped as in the prior art array of FIGURE 1 but rather are coadjacently disposed in a planar relation on the support surface 12. It will be appreciated that the planar assembly of modules provides a notable basic advantage over the shingle assembly in that a greater surface area of each module is exposed to radiation and thus the output per weight factor is optimized. This feature has been recognized previously of course, and numerous prior art solar cell arrays utilized lay down modules. All previous lay down module arrays, however, have been severely hampered by inadequacies of mechanical and electrical interconnection. Consequently, the lay down module array has not been acceptable for use in most applications involving high level vibrational modules. As will be discussed hereinafter, the lay down module array of this invention is adapted to withstand tremendous level vibrational modes and is largely limited in this aspect only by the flexibility of the cooperating support surface. In other words, the lay down module array of this invention will withstand any vibrational modes which might be permitted by any known support structure itself. This invention, of course, is not restricted to the use of any particular type of support structure. Generally, the support structure is a thin metal sheet, for example, aluminum 1/32 inch thick attached to a hexagon honeycomb or a truss framing which is designed primarily in consideration of rigidity and of weight factors.

The individual modules 11 are adhered to the support structure 12 by any conventional means, preferably nonorganic. The structure is usually of metal and acts not only as a support means but also as a heat sink. Thus the modules must be adhered such that they are in heat conductive relation to the surface but electrically isolated therefrom. Often the metal surface is coated with various insulating products having a voltage breakdown reading of at least 500 volts and having a Megger reading of at least 20,000 megohms measured at 500 volts. In addition, various other electrical insulation means such as Fiberglas cloth mesh may be employed as a spacer intermediate the modules and the metal support structure. Thereupon a suitable cementing or bonding medium, of the silicone rubber variety, for example, may be utilized to adhere the modules to the support surface.

It will be appreciated that a metallic support surface is not essential to the device of this invention and that where heat dissipation is not a problem or other solutions to the heat dissipation problem are provided, the metal surface with all its attendant electrical isolation complications may be omitted. In such instance a nonmetallic surface might be substituted for the support surface or the mechanical-electrical interconnection of modules might be relied upon for its own support in the absence of any support surface.

Figure 3:
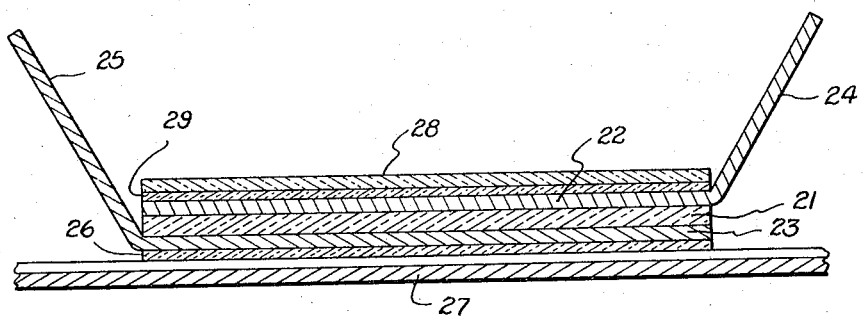
FIGURE 3 is a cross-sectional showing of a conventional solar cell module of the variety shown in FIGURES 1 and 2.

FIGURE 3 is a cross-sectional view of a typical .02 cm. thickness, 1 by 2 cm. rectangular solar cell module wherein the several elemental parts are shown, for purposes of illustration, as having a disproportionate thickness. It will be appreciated, of course, that several of these elemental parts may be of the thin layer variety. In FIGURE 3, a slab 21 of semiconductor material, for example, silicon which has been treated to form a barrier region, preferably of N on P variety, near the upper surface thereof, has a contact 22 and a contact 23 bonded to the top and bottom surfaces respectively of the slab 21. Normally the top contact 22 has a thin tine forked configuration with a thin bar section interconnecting the tines at one edge of the slab. Likewise, the bottom contact 23 comprises a thin metallic coating which substantially covers the bottom surface of the slab 21. Tab sections 24 and 25, which facilitate electrical interconnection of the modules in the various embodiments of this invention, are connected to the top and bottom contacts 22 and 23, respectively, and, for purposes to be discussed in detail hereinafter, are disposed at an obtuse angle with respect to the plane of the slab 21, nearly perpendicular, such that the tab sections project above the upper surface of the slab. It will be appreciated that the tab sections 24 and 25 and the contacts 22 and 23, respectively, may be integral as shown in FIGURE 3 or may be separate components electrically and mechanically bonded at some select point. The bottom surface of the slab 21 is bonded by a layer of silicone rubber, indicated at 26, to the support structure 27. Cover slide 28, for example .06 inch glass, which generally serves as an interference filter and may be of the blue-red type and serves to cut the spectrum both on the blue side and on the red side above 1100 millimicrons, is adhered by means of a selected adhesive, indicated at 29, to the top surface of the slab 21. Preferably, this adhesive is of the silicone variety because this type of adhesive does not tend to brown when subject to ultra-violet emission and because it enables simple removal of the cover slide without damage to the solar cell, if necessary. It will be appreciated, of course, that FIGURE 3 is merely illustrative of one variety of solar cell module currently in use and that the incorporation of a module of the type described in FIGURE 3 is not essential to the device of this invention. In particular, solar cell devices of the type including a P on N barrier region may be employed in applications wherein the selected characteristics of this type solar cell are appropriate to meet the needs of such applications.

FIGURE 4 is a showing of several modules connected in a series wherein each of the tab sections 24 and 25 comprises a pair of tabs $a$ and $b$ and the tab sections 24 and 25 are different. In this embodiment, the tab section 24 is a wire section, for example, .01 inch diameter, and the tab section 25 is a metallic mesh of the expanded metal variety, for example. Both tab sections are made of a metallic material having selected characteristics which designate the material as solderable, weldable and nonmagnetic. It has been found that thin wire sections and thin sheet sections of nickel-copper alloys having a maximum nickel content of approximately 70% have these attributes and are sufficiently resilient to permit flexing of the magnitude anticipated during launch. In the case of thin metal sheet, it has been found that sheeting, for example .004 inch in thickness, has a much greater rigidity characteristic in both planar orthogonal considerations when processed in accordance with standard expanded metal techniques and that .004 in thickness sheeting, so processed, is compatible with .01 inch diameter wire section of like material in the embodiments of this invention. While the exact nickel content of this alloy does not appear to be critical, experience has shown that a nickel content above the maximum amount will render the material magnetic. The minimum nickel content of the alloy is determined by the amount required to permit welding. The metallic tab sections 24 and 25 are generally soldered to the bottom surface of the solar cell slab and may be welded or soldered at their point of union, indicated at 31, as desired. It will be appreciated, of course, that in the event a soldered tab union point 31 is desired, the general alloy requirements are reduced and various other semi-rigid metallic alloys having little if any nickel content or other pure metals which are nonmagnetic and solderable may be employed. It has been found, however, that welded tab union points afford a greater reliability and are preferred for most purposes. In addition, welding involves a minimum amount of heating and in this matter insures that the photo voltaic properties of each solar cell are not disturbed to any significant degree during assembly of the array.

FIGURE 5 is a showing of several module groupings each including modules which are series connected in shingle fashion, wherein the tab sections 24 and 25 each include a single tab. As in the embodiment of FIGURE 4, the tab section 24 is a wire section and is connected to the top contact 22 of an end module. Likewise, the tab section 25 is a metallic mesh and is connected to the bottom contact 23 of the end module. It is understood, of course, that more than one tab, as in the embodiment of FIGURE 4, may be employed to interconnect the module groupings, if desired.

It will be appreciated that tab section 24 may comprise a wire built in the form of a triangle with the break in the side of the triangle which is contiguous with the contact 22 as shown in FIGURE 5. Alternatively, the break might be at the point of union indicated at 31. Likewise, it will be appreciated that it is not essential that a triangular tab section be utilized and that tab sections having other configurations, such as square, rectangular or round, may be substituted as desired.

It is readily apparent, of course, that series connected modules, whether constructed in accordance with the present invention or in accordance with the prior art, have a major inherent disadvantage in that one break in the series connection disables all modules in the series connection. Such compound disruption of a grouping by a single break is avoided generally by a parallel connection of modules, but in the past this has required the employment of other interconnection techniques which are less than satisfactory for many space vehicle applications.

FIGURE 6 is a showing of several modules connected in parallel in accordance with the present invention and having the superior interconnection features discussed in connection of the embodiments of FIGURES 4 and 5 which affords a greater redundancy advantage than has been attained heretofore whereby a multi-fold factor of the array is obtained.

In the embodiment of FIGURE 6 an interconnection involving two pair of tabs in each of the tab sections 24 and 25 is employed. It will be noted that this is substantially similar to the interconnection shown in the embodiment of FIGURE 4. In this embodiment, however, a continuous wire tab section contiguous with the top contact of each co-adjacently disposed module in the parallel grouping is employed. Likewise, a continuous metal mesh contiguous with the bottom contact of each respective module is employed. In addition, for reasons to be explained in detail in connection with FIGURE 8, a second wire indicated at 32 may be disposed as shown in contiguous relation with the bottom contact of each respective module in the parallel grouping in the general vicinity of the continuous wire tab section 24 on the top of the solar cell modules.

Figure 7:
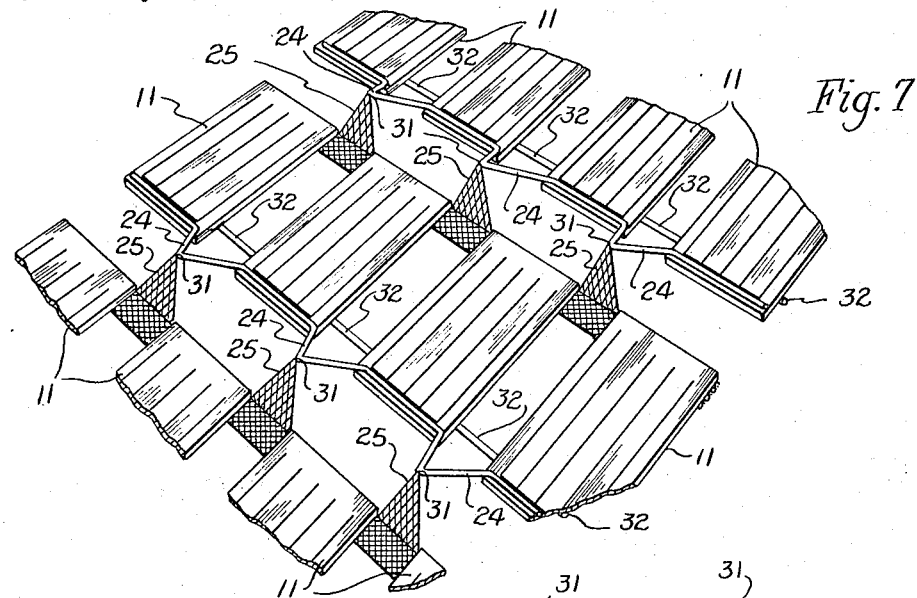
FIGURE 7 is a showing in perspective of several solar cell modules connected in parallel in accordance with a fourth embodiment of this invention.

In the embodiment of FIGURE 7, the interconnection includes the continuous wire tab section 24, the continuous metal tab section 25, and the second wire 32, but the tab sections are adapted to provide an improved array flexibility. In particular, the tab sections 24 and 25 are disposed with the tabs in intermediate relation with respect to the several co-adjacent modules of each parallel grouping. It will be appreciated that the relatively wide spacing between modules in the embodiment of FIGURE 7 is merely for purposes of illustration and that the spacing between modules may be substantially reduced, if desired, the only significant requirement being one of clearance between modules during flexing. As in the case of the first, second and third embodiments of this invention shown in FIGURES 4, 5 and 6, respectively, the tab sections 24 and 25 may be soldered or otherwise electrically and mechanically connected to their respective contacts 22 and 23 on each module, and the tab sections may be soldered, welded or otherwise electrically and mechanically connected at their point of union 31.

Figure 8B:
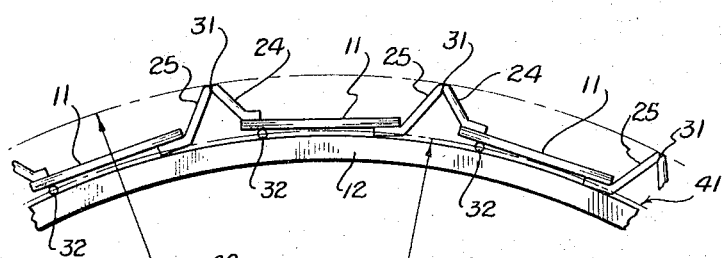
Figure 8C:
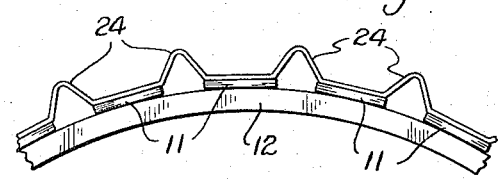

Referring now to FIGURES 8a, b and c, it is believed that the unusual flexibility of an array constructed in accordance with the first, second, third and fourth embodiments of this invention, whether in series or in parallel arrangement, is best understood upon consideration of a diagrammatic cross-sectional showing of a series connection of a plurality of modules in parallel connection as shown in the embodiments of FIGURES 6 and 7. It will be noted that the portion of the metallic mesh tab section 25 in contiguous relation with the bottom contact 23 at one end and of each module and the wire 32 in contiguous relation with the bottom contact 23 at the opposite end of each module lie in the same plane, indicated at 41. It has been found that this planar arrangement of the metallic mesh 25 and the wire 32 is of major significance in minimizing interplanar stress and strain in the array. This is not an especially critical factor with regard to flexure in the direction of the series connection of the parallel grouping. It is, however, in view of the fragile nature of the modules, exceedingly important to maintain the same radius of curvature at both ends of each module during flexure in the orthogonal direction within each parallel grouping. As shown in FIGURE 8b, the radius of curvature indicated at 42, which is defined by the wire 32 and the pulse of tab section 25 contiguous with the bottom contact, and the radius of curvature indicated at 43, which is defined by the points of union 31 of the tab sections 24 and 25, are substantially different. It is readily apparent that if one end of each parallel grouping of modules had the radius of curvature indicated at 42 and the other end of this grouping had the radius of curvature indicated at 43, tremendous interplanar stress results during flexure. Flexure in the direction of the series connection is illustrated in FIGURE 8b. It will be seen that a substantially greater flexibility may be obtained in this direction due to the absence of a critical radius of curvature factor. That is, the radius of curvature in this direction is largely dependent upon the flexibility of the tab section and may defer to some direction at each tab section interconnection. Preferably, of course, the flexibility of the tab section interconnections is substantially uniform such that the array is subject to uniform stress and strain forces at all points thereon. Further, it will be seen that the flexibility required is greatly reduced by the upturned aspect of the tabs.

It has been found that the solar cell array of the present invention is highly flexible and that a simple 4 or 5 module parallel grouping as shown in the embodiment of FIGURE 7, for example, may be contorted sufficiently to touch end sections without significant damage to the grouping. Also, it has been found that two series connected modules may be folded upon themselves in back-to-back relation without significant damage. Obviously, the stress and strain in such contortions is substantially greater than that which might be anticipated in any vehicle launch operation.

As mentioned previously, the individual modules in the array of this invention may be appraised independently in terms of color response, installation breakdown, efficiency, temperature response, characteristic, aging, etc., and a reasonably accurate predetermination of over-all operational characteristics can be made prior to assembly of the array. Thus, the best modules can be assembled to provide the optimum array output characteristic. That is, in accordance with this invention arrays having an optimum response to blue, an optimum response to reds, a selected response over an optimum period of time, or any other optimum feature may be engineered and built to perform as designed.

It is understood, of course, that each tab section in the array of this invention may include more than the two tabs per module as illustrated in the several exemplary embodiments and that it is within the purview of this disclosure that the tabs be disposed relative to the module other than as shown, i.e., on more than one side of each module and/or in a different angular relation with respect to the plane thereof including perpendicular or an obtuse angular relation, if a different degree and/or direction of flexibility between modules is desired.

Further, it is within the purview of this disclosure to utilize modules having a flat configuration other than rectangular, i.e., circular, triangular, hexagon, square or the like. These modules may be silicon as in the exemplary embodiments or may be other material which affords an effect of the photo voltaic variety upon exposure to radiation of any kind irrespective of the force of such radiation, including energy sources having a radiation output different from that of the sun. Moreover, the standard tine fork contact illustrated in each of the exemplary embodiments may be altered as preferred in selected applications without disturbing the basic concept of this invention. In particular, a contact of the weld variety may be substituted for the solder contact shown where such contact would be otherwise compatible with the module and would afford a sturdy and reliable attachment of the contact to the module.

Likewise, it is not necessary that the interconnection of tab sections involve different types of tab sections, as illustrated, and that both of the tab sections in one or more unions thereof may be the same, i.e., both wire or both metal mesh. In addition, the series connection of parallel groupings in the 3rd and 4th illustrated embodiments of FIGURES 6 and 7, respectively, is not critical to this invention and other electrical connections wherein the parallel groupings are not parallel, for example, may be employed in selected applications in accordance with practice well known in the art.

Further, it will be appreciated that in applications where the magnetic property of elements is of little consequence, the metallic tab sections may be magnetic in nature. Also, in applications in which the ambient temperature is on the non-magnetic side of the Curie point temperature for a selected metal or alloy it will be appreciated that such metal or alloy may be employed for the tab sections.

Finally, it is understood that this invention is to be limited by the scope of the claims appended hereto.

What is claimed is:
1. A solar cell array comprising
  a plurality of solar cells,
    each of said cells comprising a laminated structure having a slab of semiconductor material with first and second substantially planar contact surfaces, and
  means for interconnecting said solar cells to produce an array in which individual cells are flexibly mounted,
    said means comprising an expanded metallic mesh tab connected to said first contact surface and being disposed at an obtuse angle thereto other than parallel,
    a wire tab connected to said second contact surface and being disposed at an obtuse angle thereto other than parallel,
    said mesh tab and said wire tab being formed from a nickel and copper alloy which is non-magnetic, and
    means joining the mesh tabs to the wire tabs to form a series array.

2. The combination according to claim 1 comprising means supporting said solar cells in substantially parallel relationship,
  whereby the radii of curvature at the ends of each cell will be equal during any flexure to prevent interplanar stress and strain in the array.

3. The combination according to claim 2 wherein said means supporting said solar cells comprises
  wire members disposed under said first contact surfaces and lying in the same plane as said mesh tabs at the points of connection of said mesh tabs to said first contact surfaces.

References Cited

UNITED STATES PATENTS 2,779,811   1/1957   Picciano et al. _____ 136—89
3,094,439   6/1963   Mann et al. _____ 136—89

ALLEN B. CURTIS, *Primary Examiner.*